(12) United States Patent
Yu et al.

(10) Patent No.: US 9,084,263 B2
(45) Date of Patent: Jul. 14, 2015

(54) NETWORK CONNECTION METHOD AND SYSTEM

(71) Applicant: Huawei Technologies Co., Ltd., Shenzhen, Guangdong (CN)

(72) Inventors: Yinghui Yu, Shenzhen (CN); Miao Zhang, Shenzhen (CN); Guanglin Han, Shenzhen (CN); Yue Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 255 days.

(21) Appl. No.: 13/762,691

(22) Filed: Feb. 8, 2013

(65) Prior Publication Data

US 2013/0148607 A1 Jun. 13, 2013

Related U.S. Application Data

(63) Continuation of application No. PCT/CN2011/078049, filed on Aug. 5, 2011.

(30) Foreign Application Priority Data

Aug. 12, 2010 (CN) .......................... 2010 1 0251783

(51) Int. Cl.
*H04W 76/02* (2009.01)
*H04W 72/04* (2009.01)
(Continued)

(52) U.S. Cl.
CPC ........... *H04W 72/048* (2013.01); *H04L 61/103* (2013.01); *H04L 61/2069* (2013.01); *H04W 8/186* (2013.01)

(58) Field of Classification Search
None
See application file for complete search history.

(56) References Cited

U.S. PATENT DOCUMENTS

2006/0056447 A1* 3/2006 Farnsworth et al. .......... 370/466
2007/0259675 A1 11/2007 Worrall et al.
(Continued)

FOREIGN PATENT DOCUMENTS

CN 101406092 A 4/2009
CN 101467477 A 6/2009
(Continued)

OTHER PUBLICATIONS

"Paging and downlink transmission for MTC," 3GPP TSG RAN WG2 Meeting #70, May 2010, Agenda Item 4.3.2, 3$^{rd}$ Generation Partnership Project, Valbonne, France.
(Continued)

*Primary Examiner* — Hassan Phillips
*Assistant Examiner* — Duc Duong
(74) *Attorney, Agent, or Firm* — Leydig, Voit & Mayer, Ltd.

(57) ABSTRACT

The present invention discloses a network connection method and system. The method includes: grouping a plurality of terminals, allocating group identities, and establishing a mapping relationship between the group identities and terminal identities; establishing a group-based signaling radio bearer and a group-based data radio bearer for each group; allocating, when a terminal in each group access a network, the terminal the group-based signaling radio bearer and group-based data radio bearer corresponding to the group to which the terminal belongs according to a mapping relationship between a group identities and a terminal identity, so that the terminals initiate network access by using the group-based signaling radio bearer and the group-based data radio bearer. The signaling overhead of establishing signaling connection and data bearer may be reduced though the technical solution of the present invention.

26 Claims, 11 Drawing Sheets

(51) Int. Cl.
*H04W 8/18* (2009.01)
*H04L 29/12* (2006.01)

(56) References Cited

U.S. PATENT DOCUMENTS

| | | | |
|---|---|---|---|
| 2008/0242336 A1 | 10/2008 | Willigenburg | |
| 2008/0311923 A1* | 12/2008 | Petrovic et al. | 370/329 |
| 2011/0274070 A1 | 11/2011 | Xia et al. | |
| 2011/0294474 A1* | 12/2011 | Barany et al. | 455/414.1 |
| 2012/0033623 A1* | 2/2012 | Chu et al. | 370/329 |
| 2012/0106391 A1* | 5/2012 | van Loon et al. | 370/252 |
| 2012/0140632 A1* | 6/2012 | Norp et al. | 370/235 |
| 2012/0329501 A1* | 12/2012 | Balck et al. | 455/509 |

FOREIGN PATENT DOCUMENTS

| | | |
|---|---|---|
| CN | 101500312 A | 8/2009 |
| CN | 101521946 A | 9/2009 |
| CN | 101772171 A | 7/2010 |
| EP | 0889611 A1 | 1/1999 |
| EP | 1282276 A1 | 2/2003 |
| WO | WO 2010054697 A1 | 5/2010 |

OTHER PUBLICATIONS

"MTC group subscription," 3GPP TSG SA WG2 Meeting #78, Feb. 2010, Agenda Item 9.7, $3^{rd}$ Generation Partnership Project, Valbonne, France.

"APN based Policing solution for MTC Groups," 3GPP TSG SA WG2 Meeting #78, Feb. 2010, Agenda Item 9.7, $3^{rd}$ Generation Partnership Project, Valbonne, France.

Written Opinion of the International Searching Authority in corresponding PCT Patent Application No. PCT/CN2011/078049 (Nov. 17, 2011).

International Search Report in corresponding PCT Patent Application No. PCT/CN2011/078049 (Nov. 17, 2011).

"Technical Specification Group Radio Access Network; Evolved Universal Terrestrial Radio Access (E-UTRA); Radio Resource Control (RRC); Protocol Specification (Release 9)," 3GPP TS 36.331, Jun. 2010, Version 9.3.0, 3GPP, Valbonne, France.

"Resource sharing solution for MTC Groups," 3GPP TSG SA WG2 Meeting #S2-79E, TD S2-103106, $3^{rd}$ Generation Partnership Project, Valbonne, France (May 6-13, 2010).

* cited by examiner

NETWORK CONNECTION METHOD AND SYSTEM

CROSS-REFERENCE TO RELATED APPLICATIONS

This application is a continuation of International Patent Application No. PCT/CN2011/078049 filed on Aug. 5, 2011, which claims priority to Chinese Patent Application No. 201010251783.2, filed on Aug. 12, 2010, both of which are hereby incorporated by reference in their entireties.

FIELD OF TECHNOLOGY

The present invention relates to communication technologies, and particularly, to a network connection method and system.

BACKGROUND

In the most existing mobile communication systems, such as Global System for Mobile Communications (GSM), Wideband Code Division Multiple Access Wireless (WCDMA), Code Division Multiple Addressing (CDMA), Worldwide Interoperability for Microwave Access (WiMAX), CDMA2000, TD-SCDMA, Long Term Evolution (LTE), WLAN/WiFi and other wireless communication systems, when a terminal initiates an uplink service, a random access process is performed firstly. At this time, since there may be several terminals to initiate random accesses simultaneously and to choose the same access chance and access code, it will cause an access collision, thus bringing an access failure of this time, and the access failure will cause an increased access delay and decreased access success rate. In current mobile communication systems, more resources are generally allocated, so as to make a lower collision probability to ensure time delay and access success rate of access.

With the development of mobile communication, Machine to Machine (M2M) communication appears, while Internet of Things (IOT) means an application of M2M in a wide area network, particularly, in a mobile operator's network, namely a radio data transmission service which is used to service the Machine to Machine through a special trade terminal by taking a mobile network operator's wireless network as a platform and adopting multiple transmission manners (e.g., CDMA, GSM and so on). The M2M/IOT has a wide field of application, which may be applied to various scenes, such as intelligent transport, telemedicine, monitor and control, smart grid, environmental detection, smart homes and so on. At present, the M2M and Internet of Things become a hot point for the operators, and various applications based on the M2M and Internet of Things are developing rapidly. Unlike the previous Human to Human (H2H) communication, M2M communication has a larger amount of terminals, which can achieve ten times of H2H communication terminals, or even more, for example, about magnitude of 50 billion.

Machine Type Communication (MTC) means network communication (i.e., M2M application) performed without human's participation between one or more network elements, for example, applications such as traffic control and management, factory monitor and control, and remote meter reading, etc. In an M2M application, multiple Machine to Machine Equipments (M2ME) with a same M2M application form a whole, which is called Group for short.

Machine type communication device identity shall uniquely identify one M2M terminal, which may be International Mobile Subscriber Identity (IMSI), Mobile Station International ISDN Number (MSISDN), IP Address (IP addr), IP Multimedia Public Identity (IMPU), IP Multimedia Private Identity (IMPI) and the like.

Corresponding time and frequency resources are only allocated when a user needs to communicate, because of limitations of wireless communication resources. When a user needs to initiate communication, a random access process is performed firstly, then Radio Resource Control (RRC) connection setup and data transmission are further performed, and lastly, the occupied resources are released when the communication is finished. Taking LTE as an example, the random access resources includes two parts, one being a slot and frequency on which the random access is initiated and the other being a used Preamble (Preamble). In the existing cell radio communication system, random access is performed two ways, namely, a contention based way and a non-contention based way.

The non-contention based random access way means that an eNodeB (eNB) informs a User Equipment (UE) to use its own unique access resources. Since the access resources need to be allocated by the eNB, it needs larger system overhead and is generally used in a scene with a high demand on time delay, such as when handover or drop-call occurs.

In the contention based random access way, an eNB points out, in a broadcast message, the information of the access resources on which a random access is allowed to be initiated in the present cell. Then a UE selects one allowed Preamble randomly, selects random access frequency resources at next one moment at which the random access is allowed, and then initiates a random access at the selected random access time and frequency position. Since each UE selects random access resources independently and randomly, when multiple UEs select the same random access resources, a conflict will occur. According to a conflict solving scheme in the existing protocol, at most one of the multiple UEs to which the conflict occurs can make a successful access, while all other UEs initiate access attempt again only after backing off a period of time and backs off again when the conflict occurs again until they make a successful access or a maximum value of access attempts is reached. The conflict will prolong the access time of terminals and bring extra burdens to the network and terminals.

However, the amount of terminals participating in M2M communication is very large, while the interaction flow rate of each terminal may be very small and the interaction may be abrupt. The function realized by the M2M terminal (also called MTC terminal), which only needs to implement some special information transmission interaction, is relatively single. Positions of some terminals may be relatively fixed, or may not be often changed. Actions of M2M terminals under one special application are consistent.

In an M2M service, since the amount of MTC terminals is very large, if a large amount of MTC terminals access the network and contend for network resources, new burden will be brought to the network, especially in some application scenes, such as intelligent meter reading service.

Taking intelligent transportation as an example, one typical intelligent transport system includes a GPS (Globe Positioning System)/GLONASS (Global Navigation Satellite System) satellite positioning system, a mobile vehicle terminal, a radio network and intelligent transport systems (ITS) control center. The vehicle terminal receives ranging information of a navigation satellite network through a GPS module, and transfers information, such as, longitude, latitude, speed, time of vehicle and the like, to a microcontroller. The vehicle state information is collected by a video imaging device. The microcontroller performs a bidirectional information interaction with an ITS control center through a GPRS module to complete functions, such as, vehicle monitor and control, etc.

In another example, taking the smart grid as an example, the smart grid needs all smart grid terminals to report data periodically. For example, for electronic meter reading service, all smart grid terminals report data to a certain special server at a certain special time. For example, many national intelligent grids require a large amount of MTC terminals to transmit uplink meter reading data frequently in a 5-minute cycle, and the data amount of meter reading data is small.

In the existing network, a dedicated signaling connection and a dedicated data bearer need to be established for a terminal to transmit uplink data, and the network needs to allocate a dedicated Cell Radio Network Temporary Identity (C-RNTI) to each terminal. After transmitting the uplink data completely, the UE releases the Radio Resource Control (RRC) connection and enters an IDLE state.

For example, in the application scene of intelligent monitor and control or that of measurement, a large amount of MTC terminals need to report a data packet with a small amount of data periodically and frequently, and when transmitting data each time, a large amount of MTC terminals establish signaling connection and data radio bear, thus bringing a large signaling overhead and consuming a large amount of network resources.

In order to overcome the issue of large signaling overhead brought by this frequent state transition, in the prior art, an MTC terminal may be always kept in a connective state, but if the MTC terminal is always kept in the connective state, a large amount of network configuration resources, such as C-RNTI, are occupied.

In addition, in the prior art, if an H2H communication is adopted, one cell needs to support 16K (14 bits) users, and it will bring the lack of C-RNTI if an MTC terminal is introduced.

Therefore, in the M2M communication, when an MTC terminal transmits data frequently and periodically, frequently establishing signaling connections and data bearers will bring large signaling overhead and may cause the lack of C-RNTI.

SUMMARY OF THE INVENTION

The embodiments of the present invention provide a network connection method and system, which can reduce the signaling overhead of establishing a signaling connection and a data bearer.

At one aspect, the present invention discloses a network connection method, including: network groups a plurality of terminals, allocates group identities, and establishes mapping relationships between the group identities and terminal identities; the network establishes a group-based signaling radio bearer and a group-based data radio bearer for each group; the network allocates, when a terminal in each group access a network, the terminal the group-based signaling radio bearer and the group-based data radio bearer corresponding to the group to which the terminal belongs according to the mapping relationships between the group identities and terminal identities, so that the terminal initiates network access by using the group-based signaling radio bearer and the group-based data radio bearer.

At another aspect, the present invention discloses a network connection method, including: a terminal receives a group-based signaling radio bearer and a group-based data radio bearer corresponding to a group to which the terminal belongs and allocated to the terminal by a network according to a mapping relationship between a group identity and a terminal identity; the terminal initiates network access by using the group-based signaling radio bearer and the group-based data radio bearer.

At another aspect, the present invention discloses a communication network element, including: a grouping unit for grouping multiple terminals and allocating group identities; a mapping establishing unit for establishing mapping relationships between the group identities and terminal identities; a resource establishing unit for establishing a group-based signaling radio bearer and a group-based data radio bearer for each group; an allocating unit for allocating, when a terminal in the group access a network, the terminal the group-based signaling radio bearer and the group-based data radio bearer corresponding to the group to which the terminal belongs according to the mapping relationship between the group identities and terminal identities.

At another aspect, the present invention disclose a terminal, including: a receiving unit for receiving a group-based signaling radio bearer and a group-based data radio bearer corresponding to a group to which the terminal belongs and allocated to the terminal by a network according to a mapping relationship between a group identity and a terminal identity; an accessing unit for initiating network access by using the group-based signaling radio bearer and the group-based data radio bearer.

According to the technical solution under the embodiments in the present invention, when a connection is established between a terminal and a network, the signaling overhead of establishing a signaling connection and a data bearer may be reduced.

BRIEF DESCRIPTION OF THE DRAWINGS

To illustrate the technical solution under the embodiments of the present invention more clearly, a brief introduction on the accompanying drawings which are needed in the description of the embodiments is given below. Apparently, the accompanying drawings in the description below are merely some of the embodiments of the present invention, based on which other drawings can be acquired by the persons of ordinary skill in the art without any inventive effort.

DETAILED DESCRIPTION OF THE EMBODIMENTS

In the following description, in order to illustrate rather than to limit, specific details, such as special system architecture, interface, technology and the like, are mentioned, so as to understand the present invention thoroughly. However, those skilled in the art should understand that the present invention can also be implemented in other embodiments without these details. In other cases, the specific description on the well-known apparatuses, circuits and methods are omitted to avoid unnecessary details to hinder the description of the present invention.

The technical solution of the present invention may be applied to various communication systems, such as GSM, Code Division Multiple Access (CDMA) system, TD-SCDMA, CDMA2000, WIMAX, Wideband Code Division Multiple Access Wireless (WCDMA), General Packet Radio Service (GPRS), Long Term Evolution (LTE), etc.

A terminal may be a mobile terminal, a fixed terminal or an MTC terminal, etc.

An MTC terminal means a terminal adopting M2M communication, which may be a terminal applied to various scenes, such as intelligent transport, telemedicine, monitor and control, smart grid, environment detection, smart homes, etc.

Figure 1:
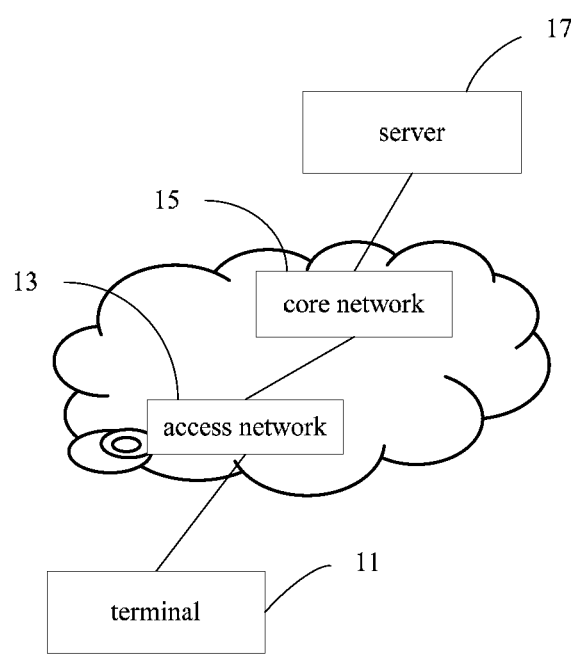
FIG. 1 is a schematic structure diagram of a communication system of an embodiment according to the present invention.

As shown in FIG. 1, a schematic structure diagram of a communication system of an embodiment according to the present invention is illustrated, wherein the communication system mainly includes an access network 13, a core network 15 and a server 17.

The access network 13 and core network 15 connect and communicate with each other by wire or wireless, for example, by an optical fiber. There may be one or more services 17, and the service 17 and core network 15 connect and communicate with each other by wire or wireless, for example, by an optical fiber. The access network 13 may connect and communicate with one or more terminals 11 by wire or wireless.

The server 17 may be an MTC Server, or other type of server. The terminal 11 may be any terminal capable of communication, such as mobile phone, fixed phone, computer, MTC terminal, which is not limited by the present invention. The access network 13 and the core network 15 may be respectively an access network and a core network of any system of communication networks, such as WCDMA, GSN, CDMA, or LTE, etc., which is not limited by the present invention.

Communication systems with different systems mean communication systems adopting different access technologies.

Figure 2:
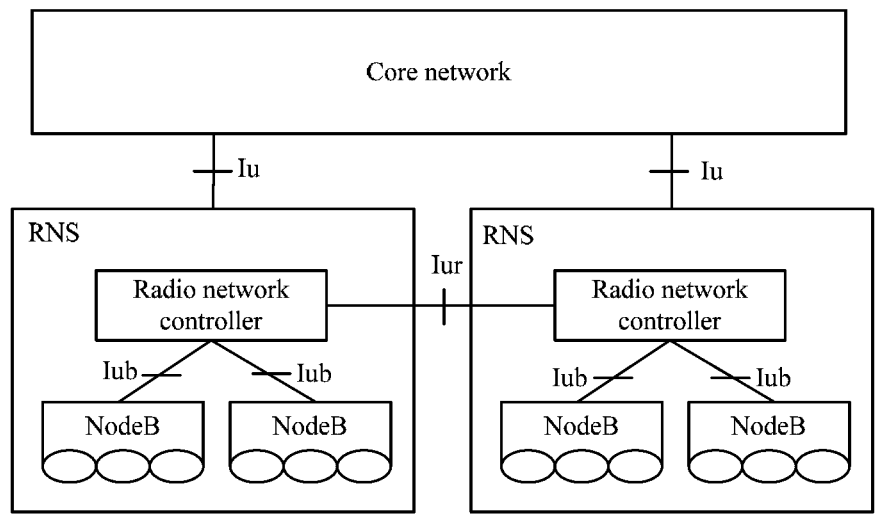
FIG. 2 is a schematic structure diagram of a UMTS system of another embodiment according to the present invention.

For example, when the access network 13 and the core network 15 are respectively the access network and core network of WCDMA system, network structure thereof may be as FIG. 2 illustrating a schematic structure diagram of a UMTS of another embodiment according to the present invention. The Universal Mobile Telecommunication System (UMTS) adopting a similar structure as the second generation mobile communication system is a third generation mobile communication system adopting WCDMA air interface technology, wherein the UMTS system is usually called WCDMA communication system.

The UMTS system includes a Universal Terrestrial Radio Access Network (UTRAN), CN and User Equipment (UE).

As shown in FIG. 2, the UTRAN, namely the terrestrial radio access network, includes one or more Radio Network Subsystems (RNS). One RNS includes one Radio Network Controller (RNC), and one or more NodeBs. The interface between the RNC and CN is an Iu interface, and the NodeB and RNC connects with each other through an Iub interface. Inside the UTRAN, Radio Network Controllers (RNCs) interconnect through an Iur, and the Iur may be connected through a direct physical connection between the RNCs or be connected through a transmission network. The RNC is used for allocating and controlling radio resources of NodeB(s) connected or related therewith. The NodeB implements the conversion of data flow between the Iub interface and Uu interface, and also participates in part of radio resource management.

The NodeB is a base station (i.e., radio transceiver) of the WCDMA system, and connects with the RNC through an Iub interface, and mainly completes the processing of Uu interface physical protocol.

The RNC, namely Radio Network controller, is used for controlling the radio resources of the UTRAN, and mainly implements functions, such as connection setup and break, handover, macro diversity combining, radio resource management and control, etc.

Figure 3:
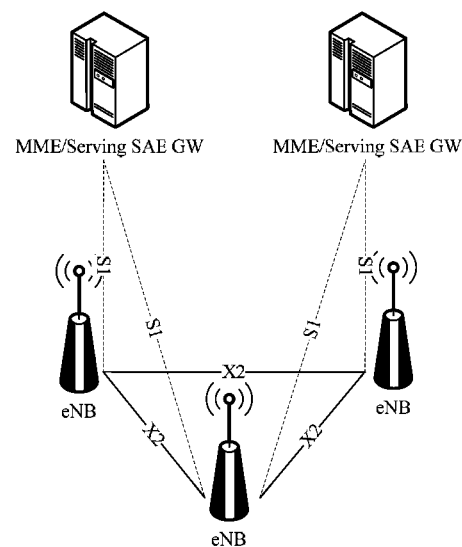
FIG. 3 is a schematic network structure diagram of an evolved access network of LTE network.

For example, when the access network 13 and core network 15 are the access network and core network of an LTE system respectively, network structure thereof may be shown as in FIG. 3 illustrating a schematic network structure diagram of an Evolved-Universal Terrestrial Radio Access Network (E-UTRAN), including a Mobility Management Entity (MME)/Serving SAE gateway (Serving SAE GW) and eNB.

The Mobility Management Entity (MME) and eNB connect with each other through an S1-MME interface, the serving SAE gateway (Serving SAE GW) and eNB connect with each other through an S1-U interface, and two eNBs connect with each other through an X2 interface.

The access network mainly includes two parts, namely an evolved eNodeB (eNB) and MME/SAE GW. The MME/SAE GW is a boundary node, and if it is considered as a part of the core network, the access network is mainly composed of an eNB layer. The eNB not only has the functions of a previous NodeB, but also can complete a majority of functions of a previous RNC, including physical layer, MAC layer, RRC, scheduling, access control, bearer control, and access mobility management, etc. An eNB and another eNB connect each other by adopting a Mesh manner.

The present invention is only described schematically by taking a WCDAM or LTE communication system as an example, but the present invention is also adaptive to communication networks of other systems, which is not limited by the present invention.

Combined with the structure diagram of a communication system shown in FIG. 1, the work process of the communication system may be as follows.

The network is used for grouping multiple terminals, establishing a based-group signaling radio bearer and a based-group data radio bearer for each group, and allocating, when a terminal in each group access the network, the terminal the based-group signaling radio bearer and the based-group data radio bearer corresponding to the group to which the terminal belongs according to a mapping relationship between a group identity and a terminal identity.

In another embodiment of the present invention, the terminals in each group access the network in sequence in manner of time-division.

For example, in network systems adopting different access technologies, an entity for grouping multiple terminals, establishing a based-group signaling radio bearer and a based-group data radio bearer for each group, and allocating, when a terminal in each group access a network, the terminal the based-group signaling radio bearer and the based-group data radio bearer corresponding to the group to which the terminals belongs, may be implemented by one or more communication network elements, for example, the entity being realized by one communication network element, or the entity being realized by different communication network elements, or part of functions being realized by one communication network element and other part of functions being realized by another communication network element, which is not limited by the present invention. For example, the communication network element may be a device in an access network, or may be a device in a core network, and may also be a separately-set device. For example, the communication network element may be a NodeB or Radio Network Controller (RNC) of an access network in a WCDMA network. For example, the communication network element may be an eNodeB, an MME or an access gateway in an LTE system. For example, the communication network element may be a Base Transceiver Station (BTS) or Base Station Controller (BSC) in a GSM or CDMA system.

In order to describe conveniently, the following embodiment is described by taking an LTE system as an example, but is adaptive to other communication systems.

Figure 4:
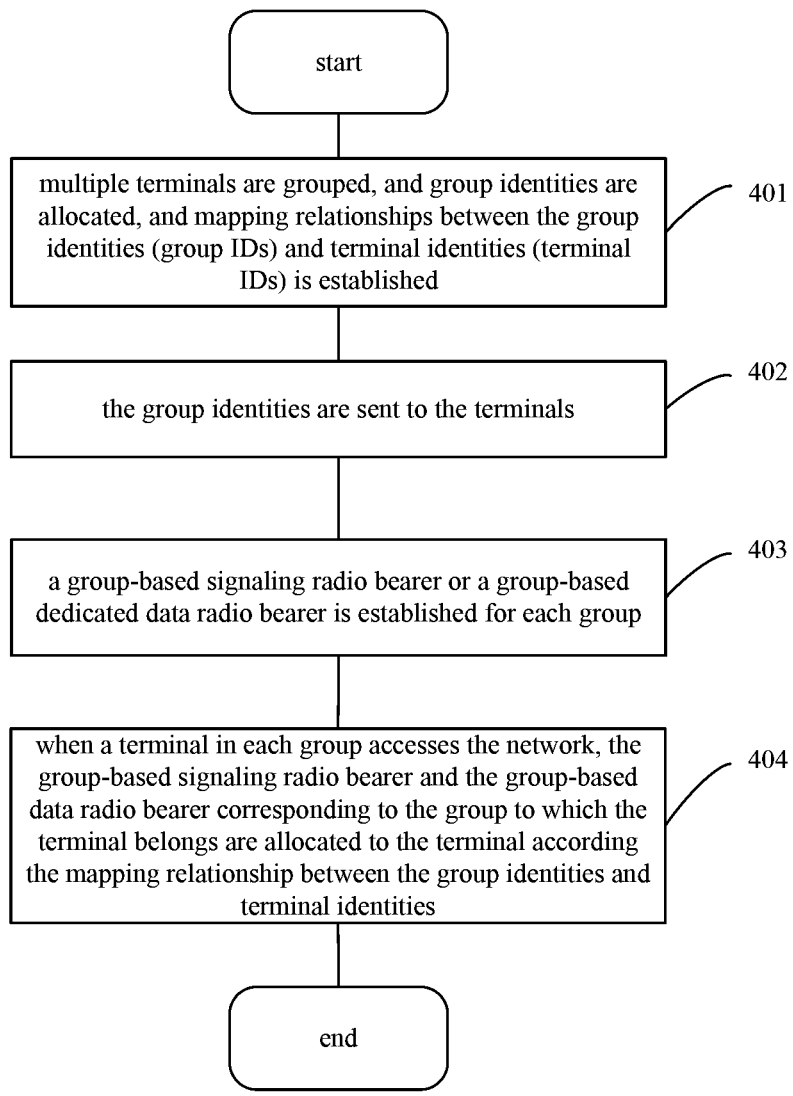
FIG. 4 is a schematic flowchart of a network connection method of another embodiment according to the present invention.

As shown in FIG. 4, a schematic flowchart of a network connection method of another embodiment according to the present invention is illustrated.

401. Multiple terminals are grouped, group identities are allocated, and mapping relationships between the group identities (group IDs) and terminal identities (terminal IDs) are established.

In network systems adopting different access technologies, the communication network elements for grouping multiple terminals and establishing mapping relationships between group identities and terminal identities are different, namely, the communication network element may be a device in an access network, or may be a device in the core network, or may also be a separately-set device. For example, the communication network element may be a NodeB or Radio Network Controller (RNC) of an access network in the WCDMA network. For example, the communication network element may be an eNodeB, an MME or an access gateway in an LTE system. For example, the communication network element may be a Base Transceiver Station (BTS, Base Transceiver Station) or Base Station Controller (BSC) in a GSM or CDMA system.

The group identity may be a group-CNRTI, group ID, etc, or may be a self-defined identifier. The terminal identity (UE ID) may be any symbol, such as IMSI, MSISDN, IP addr, IMPU, IMPI, etc, which is only used for identifying a terminal, or be a self-defined identifier.

There may be several manners for a communication network element to group multiple terminals and establish mapping relationships between group identities and terminal identities.

For example, a communication network element that is configured with at least one group identity when the network is configured initially allocates a same group identity to all terminals in an identical cell, and establishes mapping relationships between the group identity and terminal identities. For example, the communication network element allocates group identities in ascending order and establishes mapping relationships between the group identities and terminal identities, and vice versa.

In another embodiment of the present invention, terminals in an identical cell may be also grouped into multiple groups. For example, the terminals are divided into different groups according to a difference in traffic type, and different group identities are allocated to different groups. For example, the terminals performing meter reading service in a smart grid belong to an identical group, while the terminals performing monitor and control service in a traffic system belong to another group. For example, one or more group identities may be allocated to one cell. For example, with regard to all terminals in the cell, different group identifies are allocated according to differences in the types of services needed to be reported by the terminals. For example, the terminals of smart grid in the cell correspond to a first group identity, and the terminals of transport system in the cell correspond to a second group identity, etc.

In another embodiment of the present invention, before allocating a group identity, a communication network element may further determine whether information of mapping relationship between group identity and terminal identity corresponding to the terminal identity is stored according to the terminal identity. If the information of the corresponding mapping relationship between group identity and terminal identity is not stored, the communication network determines the group to which the terminal belongs, allocates a group identity to the terminal, and establishes the mapping relationship between the group identity and the terminal identity. If the information of the corresponding mapping relationship between group identity and terminal identity is stored, the communication network needs not to establish the mapping relationship between the group identity and the terminal identity, and may directly use the group identity in a subsequent process.

In another embodiment of the present invention, when it is determined that the information of mapping relationship between group identity and terminal identity corresponding to the terminal identity is not stored and it is also determined that there is no allocable group identity, the network may further increase a group identity, and establish a mapping relationship between the increased group identity and the terminal identity.

In another embodiment of the present invention, the communication network element may further allocate sequence numbers to terminals in an identical group, and establish mapping relationships between the sequence number and terminal identity, so that each terminal in the identical group to initiate network access in sequence number in manner of time-division.

In another embodiment of the present invention, the group identity corresponds to multiple sequence numbers, and all terminals in an identical cell corresponds to one group identity or terminals with same reporting service type in an identical cell correspond to a same group identity.

For example, the group identities are configured by a server, and the communication network element, for example, an access network, such as an eNodeB of an access network, an MME or an access gateway, receives group information sent by a server (for example, MTC server), the group informing including a group identity that is an identifier of terminal group. The communication network element determines the group to which a terminal belongs, then allocates a sequence number corresponding to the group identity, for example, allocates the sequence number in ascending order and vice versa, and then establishes a mapping relationship between the group identity and a terminal identity, and may further establish a mapping relationship between the sequence number and the terminal identity.

For example, the communication network element receives the type of service reported by a terminal, and queries a corresponding group identity and then allocates the group identity to the terminal, and may further allocate a sequence number, for example, allocate the sequence number in ascending order and vice versa, and then establishes a mapping relationship between the group identity and a terminal identity, and may further establish a mapping relationship between the sequence number and the terminal identity.

For example, the group identity is reported by a terminal, and upon receiving the group identity reported by the terminal, the communication network element establishes a mapping relationship between the group identity and a terminal identity, and may further allocate a sequence number corresponding to the group identity, for example, allocate the sequence number in ascending order and vice versa, and then establishes a mapping relationship between the sequence number and the terminal identity.

For example, during the electrifying or register process of a terminal, the core network identifies the group to which the terminal belongs, for example, identifies the group to which the terminal belongs according to the type of service reported by the terminal or the access resources, and informs the access network to allocate a group identity for the terminal and to establish a mapping relationship between the group identity and the terminal identity.

In another embodiment of the present invention, the communication network element, for example, an access network, such as an eNodeB, an MME or a gateway of the access network, receives a group identity sent by a terminal, and queries whether information of mapping relationship between group identity and terminal identity is stored. If the information of mapping relationship between group identity and terminal identity is not stored, the communication network element establishes a relationship between the group identity and the terminal identity, and if the information of mapping relationship between group identity and terminal identity corresponding to the group identity is stored, the communication network element does not perform group identity allocation, and directly uses the group identity in a subsequent process.

402. The group identity is sent to the terminal.

For example, the communication network element, for example, an eNodeB of the access network, MME or gateway, sends the group identity to the terminal, wherein it is optional to send the group identity to the terminal is optional and the group identity may be not sent.

For example, the communication network element, for example, an eNodeB of an access network, an MME or an access gateway, sends the group identity to the terminal by carrying the group identity in a system message, Radio Resource Control Connection Setup (RRC CONNECTION SETUP) message, Physical Channel Reconfiguration (PHYSICAL CHANNEL CONFIGURATION RECONFIGURATION) message, Radio Bearer Reconfiguration (RADIO BEARER RECONFIGURATION) message or MAC head, etc.

In another embodiment of the present invention, the communication network element, for example, an eNodeB of an access network, an MME or an access gateway, sends the terminal a data reporting cycle (T) and a time period (i) for reporting data each time, or sends the terminal a data reporting cycle (T) and the maximum number (N) of users reporting in a reporting cycle, or sends the terminals the maximum number (N) of users reporting during a reporting cycle and a time period (i) for reporting data each time.

For example, the communication network element, for example, an eNodeB of an access network, an MME and an access gateway, further performs sequence number allocation. For example, the communication network element receives sequence number request information sent by a terminal, queries whether information of mapping relationship between the sequence number and a terminal identity corresponding to the terminal identity is stored according to the terminal identity and the identity of the group to which the terminal belongs carried by the sequence number request information. If the information of mapping relationship between the sequence number and the terminal identity corresponding to the terminal identity is stored, the communication network element sends the terminal the queried information of mapping relationship between the sequence number and the terminal identity or the sequence number included in the queried information of mapping relationship between the sequence number and the terminal identity, and if the information of mapping relationship between sequence number and the terminal identity corresponding to the terminal is not stored, the communication network element allocates a sequence number, and establishes information of mapping relationship between the allocated sequence number and the terminal identity. If there is no an allocable sequence number, the communication network element increases a sequence number and allocates it to the terminal, and establishes information of mapping relationship between the increased sequence number and the terminal identity, and sends the terminal the established information of mapping relationship between the sequence number and the terminal identity or the increased sequence number.

For example, the access network, such as a NodeB or an RNC of the access network, receives sequence number request information sent by a terminal, determines a group identity of the terminal according to the service type information of the terminal carried by the sequence number request information, and queries whether information of mapping relationship between the group identity and a terminal identity corresponding to the group identity is stored according to the group identity. If the information of mapping relationship between the group identity and the terminal identity corresponding to the group identity is stored, the access network sends the terminal the group identity included in the queried information of mapping relationship between the group identity and the terminal identity or the group identity included in the queried information of mapping relationship between the group identity and the terminal identity, and if the information of mapping relationship between the group identity and the terminal identity corresponding to the group identity is not stored, the access network establishes information of mapping relationship between the group identity and the terminal identity, and sends the terminal the established information of mapping relationship between the group identity and the terminal identity.

For example, upon receiving sequence number request information sent by a terminal, the communication network element, such as an eNodeB of an access network, an MME or an access gateway, further performs sequence number allocation. With regard to the specific contents, please refer to above description, which are not described repeatedly.

For example, the access network, such as a NodeB or RNC of the access network, receives the sequence number request information sent by a terminal through a Radio Resource Control Connection Request (RRC CONNECTION REQUEST) or Radio Resource Control Setup Complete (RRC CONNECTION SETUP COMPLETE).

403. A group-based signaling radio bearer or a group-based dedicated data radio bearer is established for each group.

The communication network element establishes a group-based signaling radio bearer (SRB) and a group-based dedicated data radio Bearer (DRB) for each group. For example, the communication network element establishes a group-based RRC connection and data bearer for each group.

In another embodiment of the present invention, the communication network element, for example, an eNodeB of an access network, an MME or an access gateway, sends a paging message to all terminals corresponding to the group identity, wherein the paging message includes access information of all members of the group and the access information includes the group-based signaling radio bearer and the group-based data radio bearer of the members of the group.

404. When a terminal in each group access the network, the group-based signaling radio bearer and the group-based data radio bearer corresponding to the group to which the terminal belongs are allocated to the terminal according the mapping relationships between the group identities and terminal identities.

When a first terminal in each group initially accesses the network, the communication network element, for example, an eNodeB of an access network, an MME or an access gateway, allocates the group-based signaling radio bearer and the group-based dedicated data radio bearer to the first terminal.

When other terminals in the group (for example, a second terminal) initially access the network, the communication network element, for example, an eNodeB of an access network, an MME or an access gateway, allocates the group-based SRB and the group-based DRB to the other terminals, rather than establishes the dedicated signaling connection and data bearer for the other terminals.

In another embodiment of the present invention, before accessing the network, a terminal calculates access information for accessing the network according to a terminal identity and group parameters of the terminal. The group parameters includes: a data sending cycle (T); a time period (i) for reporting data each time and the maximum number (N) of users reporting in a reporting cycle. The calculation method of the access information may be as follows.

N=T/i, wherein N is the maximum number of users reporting in a reporting cycle;

p=k+UE ID mod N, wherein p is a serial number to which the terminal corresponds in a reporting cycle;

SFN=floor(i*p/10), wherein SFN is a system frame number (SFN, system frame number) of a moment at which the terminal accesses the network,;

x=(i*p) mod 10, wherein x is a subframe number of a moment at which the terminal accesses the network;

i represents a period for reporting data each time, T represents a data sending cycle, UE ID is a terminal identity, floor represents rounding down, mod represents modulo and k is an integer which is larger than or equal to 0, such as 0, 1, 2, or 3, etc. The UE ID may be any identity that is only used for identifying a terminal, such as IMSI, MSISDN, IP addr, IMPU, IMPI, or may be a self-defined identity.

In order to avoid a collision when UEs with the same P value access the network in the same time, the network may divide the UEs with the same p value into different groups, and allocate a group-based connection to each group.

The above steps describing the work process are not limited by sequence. The steps may be performed simultaneously, and some steps may be reversed, for example, step 404 may be performed before step 403.

As described above, in an embodiment of the present invention, the signaling overhead of establishing a signaling connection and a data bearer may be reduced by establishing a group-based signaling radio bearer and a group-based dedicated data radio bearer.

Figure 5:
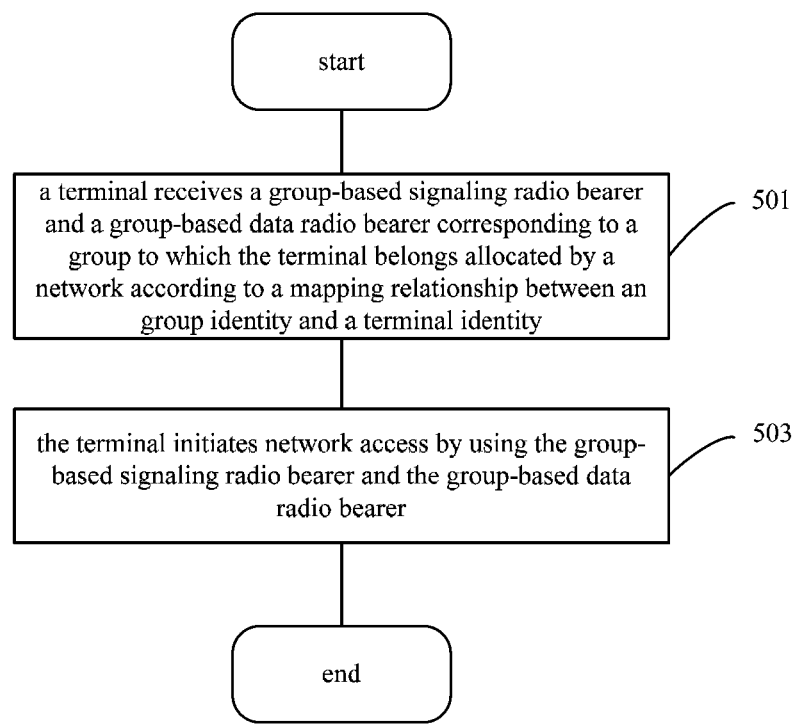
FIG. 5 is a schematic flowchart of a network connection method of another embodiment according to the present invention.

As shown in FIG. 5, a schematic flowchart of a network connection method of another embodiment according to the present invention is illustrated. The method for accessing a network may be as follows.

501. A terminal receives a group-based signaling radio bearer and a group-based data radio bearer corresponding to a group to which the terminal belongs allocated by a network according to a mapping relationship between group identity and terminal identity;

503. The terminal initiates a network access by using the group-based signaling radio bearer and the group-based data radio bearer.

The terminal may be a mobile terminal or a fixed terminal, such as an MTC terminal, namely, a terminal that may be used in various scenes, such as intelligent transport, telemedicine, monitor and control, smart grid, environment detection, smart homes, etc. All terminals in an identical cell correspond to the same group identity, or terminals in an identical cell are divided into different groups according to a difference in service type.

In another embodiment of the present invention, terminals in the same group receive a sequence number allocated by the network and each terminal in the group initiates a network access in sequence number in manner of time-division.

In another embodiment of the present invention, the terminal receives a group identity sent by the network. In another embodiment of the present invention, the terminal further receives a data reporting cycle (T) and a time period (i) for reporting data each time sent by the network; or the terminal further receives a data reporting cycle (T) and the maximum number (N) of users reporting in a reporting cycle sent by the network; or the terminal further receives the maximum number (N) of users reporting in a reporting cycle and a time period (i) for reporting data each time sent by the network.

In another embodiment of the present invention, before initiating network access, the terminal calculates access information for accessing the network according to terminal identity and group parameters of the terminal. The group parameters include: a data sending cycle (T); a time period (i) for reporting data each time or the maximum number (N) of users which can report in a reporting cycle.

The access information for accessing a network may be calculated by the following formulas:

N=T/i, wherein N is the maximum number of users reporting in a reporting cycle;

p=k+UE ID mod N, wherein p is a serial number to which the terminal corresponds in a reporting cycle;

SFN=floor (i*p/10), wherein SFN is a system frame number (SFN) of a moment at which the terminal accesses the network;

x=(i*p) mod 10, wherein x is a subframe number of a moment at which the terminal accesses the network;

i represents a time period for reporting data each time, T represents a data sending cycle, floor represents rounding down, mod represents modulo and k is an integer which is larger than or equal to 0.

In order to avoid a collision when UEs with the same P value access the network in the same time, the network may divide the UEs with the same p value into different groups, and allocate a group-based connection to each group.

Therefore, in an embodiment of the present invention, each terminal initiates network access by using the group-based signaling radio bearer and the group-based data radio bearer, thus reducing the signaling overhead of establishing signaling connection and data bearer and improving system capability.

Figure 6:
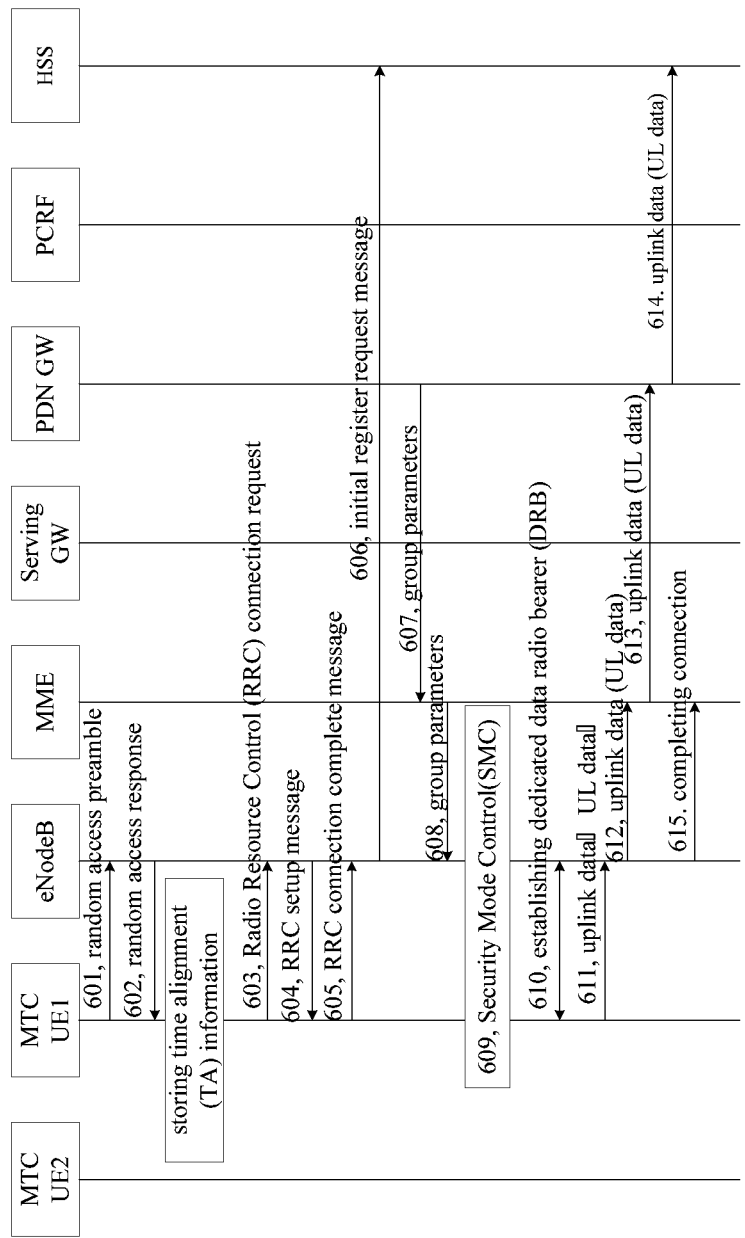
FIG. 6 is a schematic flowchart of a network connection method of another embodiment according to the present invention.

As shown in FIG. 6, a schematic flowchart of a network connection method of another embodiment according to the present invention is illustrated, which will be described as below.

Figure 7:
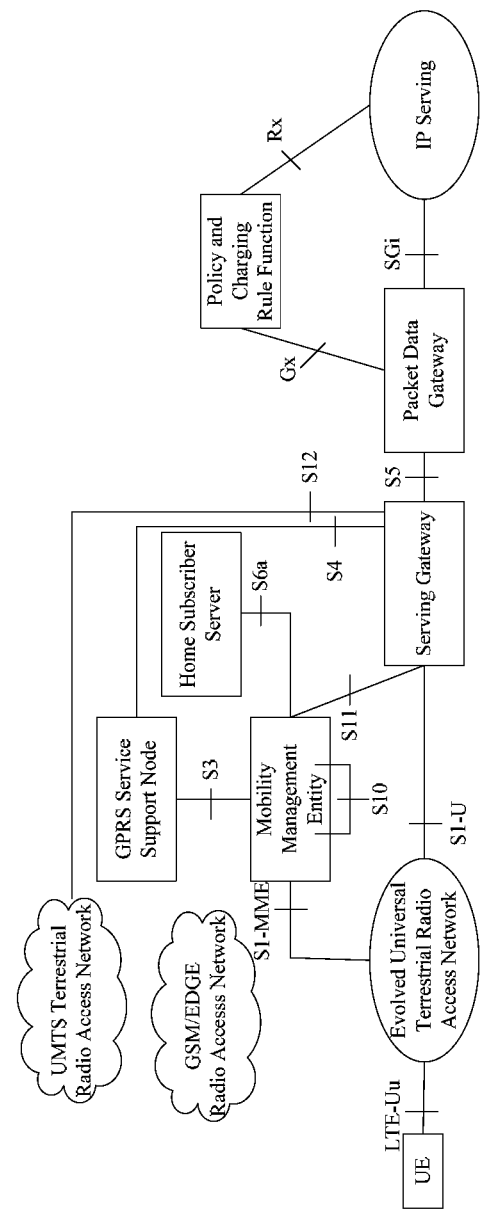
FIG. 7 is a schematic network architecture diagram of an evolved system of another embodiment according to the present invention.

As shown in FIG. 7, a schematic diagram of network architecture of an evolved system of another embodiment according to the present invention is illustrated, wherein the evolved system includes three logical function entities, namely, a Mobility Management Entity (Mobile Management Entity, MME), a Serving SAE gateway (Serving SAE GW) and a Packet Data Network System Architecture Evolved Gateway (PDN (Packet Data Network) SAE GW).

The MME takes charge of mobility management of control plane, including management of user context and mobility state, allocation of user temporary identities, etc, and corresponds to control plane part of Serving GPRS Support Node (SGSN) inside the current GPRS/UMTS system.

The Serving SAE GW takes, under an idle state, charge of initiating a paging for downlink data, and managing and saving IP bearer parameters and route information in the network, etc, and corresponds to data plane part of SGSN and Gateway GPRS Support Node (GGSN, Gateway GPRS Support Node) inside the current GPRS/UMTS system.

While the PDN SAE GW plays a role of user plane anchor between different access systems.

The Policy and Charging Rule Function (PCRF) is used for policy control division and flow charging control function.

The Home Subscriber Server (HSS) is used for storing subscription information of users.

The Mobility Management Entity (MME) and an eNB connect with each other through an S1-MME interface, and the Serving SAE Gateway (Serving SAE GW) and the eNB connect with each other through an S1-U interface, and two eNBs connect with each other through an X2 interface.

The network connection process between the evolved system and the terminal may be mainly described as follows.

601. An MTC UE1 sends a Random access preamble and prepares to access the network.

For example, it is assumed that there are at least two terminals in one group, such as MTC UE 1 and MTC UE 2, wherein the MTC UE 1 is a terminal that first requests to access the network in the group.

The MTC UE 1 sends a Random access preamble to the eNodeB.

602. The eNodeB sends a random access response message (Random access response) to the MTC UE 1.

The random access response message may include Uplink grant (UL grant) information and uplink time alignment (TA) information. The MTC UE 1 stores the TA information.

603. The MTC UE1 sends an RRC connection setup request message (RRC connection request) to the eNodeB.

604. The eNodeB returns an RRC connection setup message (RRC setup) to the MTC UE1.

The eNodeB returns an RRC connection setup message to the MTC UE1, wherein the RRC connection setup message carries the allocated group identity, such as a group-based group C-RNTI.

605. The MTC UE1 sends an RRC connection complete message to the eNodeB.

The RRC connection complete message carries an initial register request message. Of course, the MTC UE 1 may otherwise send the initial register request message to the eNodeB separately instead of carrying it in the RRC connection complete message.

606. The eNodeB forwards the initial register request message to the core network.

For example, the eNodeB sends the initial register request message to the HSS.

607-608. The eNodeB requests the core network for group information of an MTC device, and the core network sends group parameters to the eNodeB.

For example, the eNodeB allocates a group identity to the MTC UE 1 and establishes a mapping relationship between the group identity and a terminal identity. The allocation of a group identity and the establishing process of mapping relationship may be described as above, which are not described repeatedly. The PDN GW sends the group parameters to the eNodeB through the MME, wherein the group parameters includes the group identity. In another embodiment of the present invention, the eNodeB may also send the mapping relationship between the group identity and terminal identity to the MTC UE 1.

In another embodiment of the present invention, the group parameters further includes: a data sending cycle (T); a time period (i) for reporting data each time and the maximum number (N) of users which can report in a reporting cycle.

609. The eNodeB and the MTC UE 1 start a Security Mode Control (SMC).

Based on the group parameters combined with a grouping rule of RAN side, in LTE, after an initial security mode process is initiated, the eNodeB and MTC UE1 may establish data bearer and perform data transmission only after they both start the security mode. The eNodeB initiates an initial security mode process and performs the establishing process of group-based RB.

610. The eNodeB and MTC UE1 complete an establishment of a group DRB.

611-614. The MTC UE1 sends the Uplink data (UL data) to the network.

For example, the MTC UE1 sends the UL data to the eNodeB, MME, PDN GW and HSS.

615. The eNodeB and MME complete the connection setup.

As described above, in an embodiment of the present invention, the signaling overhead of establishing a signaling connection and a data bearer may be reduced by establishing a group-based signaling radio bearer and a group-based dedicated data radio bearer.

Figure 8:
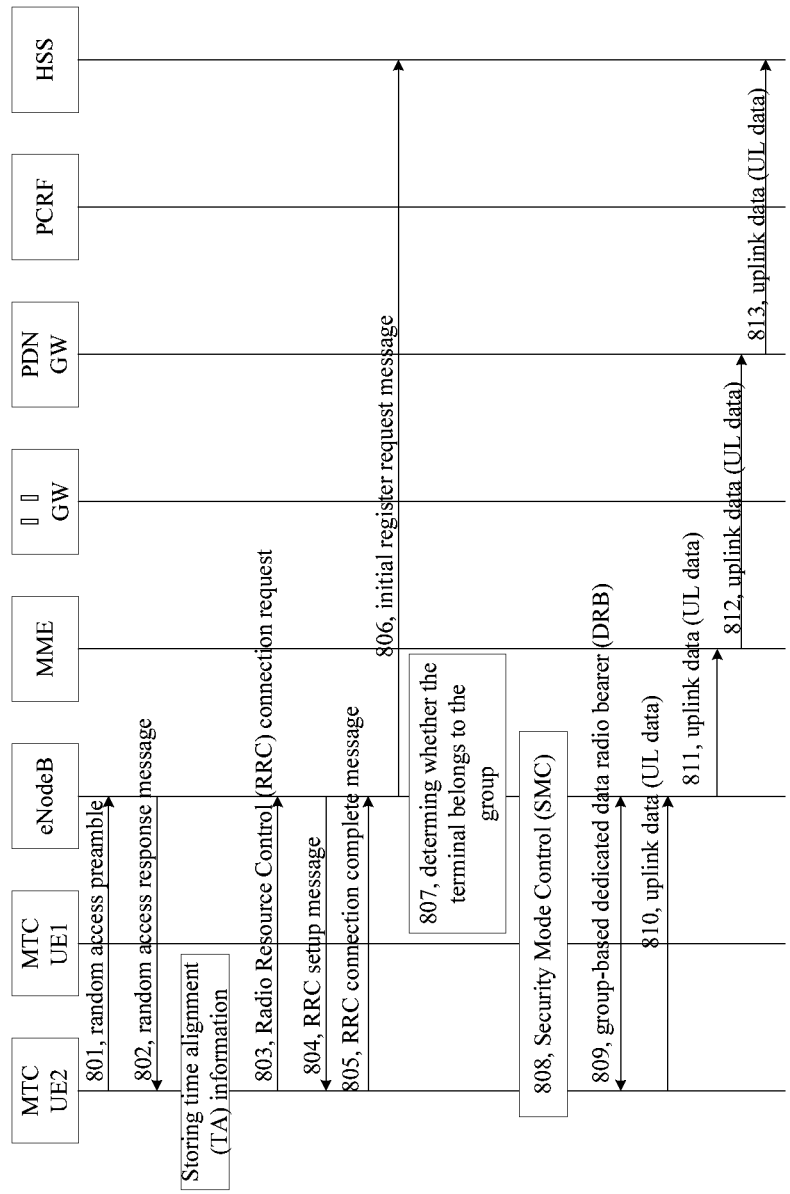
FIG. 8 is a schematic flowchart of a network connection method of another embodiment according to the present invention.

When each of subsequent MTC UEs in the group performs initial register, it is informed of the group RB. The MTC UEs in the group use a public DRB in manner of time-division, and physical resources thereof are put into effect by scheduling. For example, it is described by taking the MTC UE2 as a subsequent terminal in the group as an example. As shown in FIG. 8, a schematic flowchart of a network connection method of another embodiment according to the present invention is illustrated.

801. The MTC UE2 sends a Random access preamble to the eNodeB and prepares to access a network.

802. The eNodeB sends a Random access response (random access response message) to the MTC UE 2, wherein the message includes an UL grant (Uplink grant) and Uplink TA (time alignment, time alignment information).

The MTC UE2 stores the TA value.

803. The MTC UE2 sends an RRC connection setup request message to the eNodeB.

804. The eNodeB notifies the MTC UE 2 of group parameters, for example, a group-based SRB and a group identity, such as, group-based group C-RNTI, through an RRC connection setup message.

805-806. The MTC UE2 attaches an initial register request message to the RRC connection complete message, and the eNodeB forwards the initial register request message to the core network.

807-809. The eNodeB determines that the MCT UE2 and MTC UE1 belong to an identical group according to the group parameters of core network and grouping rule of RAN side, and performs SMC and notifies the MTC UE2 of the group-based DRB information.

810-813. Because of lower mobility, the MTC device may maintain the UL TA based on a timing of DL, and the UE may always be kept in a connection state.

In another embodiment of the present invention, after accessing a network at the first time, the terminals in a group use a sharing DRB based on a sequence in the group in manner of time-division, wherein the using manners may be the following two manners Scenario A Since the amount of data of some MTC services is relatively fixed and since the manner of cycle-reporting is adopted, such as intelligent meter reading, when configuring the group-based DRB, the network may configure a transmission of uplink semi-persistent scheduling (SPS) mode. The MTC terminals in the group use the SPS resources in various transmitting time periods thereof based on an intra-group discrete rule determined in the initial access, which is described as below.

The MTC UE1 sends uplink data at a required time of the application layer and/or access layer (e.g., a transmission cycle) by using the group-based DRB configured by the network and the corresponding SRS configuration.

The corresponding SPS configuration means a resource block used by different users.

By the end of the sending cycle of the MTC UE1, the eNodeB knows data of the MTC UE 1 is over and prepares for the transmission of the next MTC terminal. Data of each terminal may be transmitted completely by one packet by optimization, thus avoiding the step of sequencing.

There are two following manners for the eNodeB to know the data of the MTC UE1 is over. In one manner, based on the sending cycle of initial terminal of the group, such as the sending cycle of the MTC UE1, the eNodeB and MTC UE1 both know how long the sending cycle is, and once the cycle expires, the eNodeB knows the data of the MTC UE1 is over. In another manner, when the data transmission is finished, the MTC UE1 sends an empty BSR (buffer status report) to the eNodeB, thus the eNodeB determines that the MTC UE has finished the service transmission based on the empty BSR.

The terminals in the group use the sharing DBR in sequence in the group in manner of time-division. The operation of the MTC UE2 is same as that of the MTC UE1, which is not described repeatedly.

Scenario B

All terminals in the group use the group identity, such as, group C-RNTI, based on a certain grouping and discrete rule at a moment required by the eNodeB to perform an SR request for a dynamic scheduling resource.

The MTC UE1 performs the transmission of uplink data at a required time of the application layer and/or access layer, and sends an SR request to the eNodeB.

If the eNodeB knows the service type of the MTC UE1, the eNodeB directly allocates the resources needed by the service to the MTC UE1. At this time, the BSR request may be omitted.

If the eNodeB allocates BSR resources to the MTC UE1, then the MTC UE1 sends a resource request through the BSR.

When the data transmission is completed, the MTC UE 1 sends an empty BSR to the eNodeB.

After knowing that the data of the MTC UE1 is over, the eNB prepares for the transmission of next MTC terminal. The data of each MTC terminal may be transmitted completely by one packet by optimization, thus avoiding the step of sequencing.

If an ROCH of PDCP layer is set, a unidirectional ROHC is used. In another embodiment, the ROHC of PDCP layer may be not needed.

The operation of the MTC UE2 is same as that of the MTC UE1.

As described above, in an embodiment of the present invention, the signaling overhead for establishing a signaling connection and a data bearer may be reduced by establishing a group-based signaling radio bearer and a group-based dedicated data radio bearer.

Figure 9:
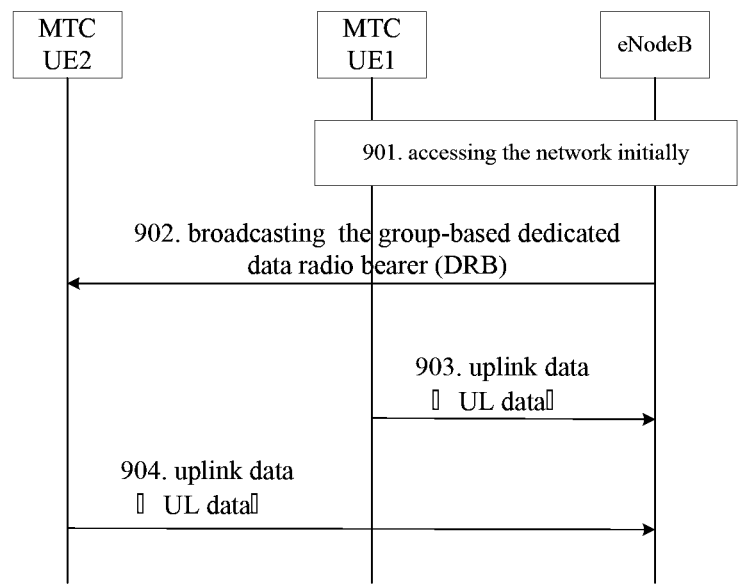
FIG. 9 is a schematic flowchart of a network connection method of another embodiment according to the present invention.

As shown in FIG. 9, a schematic flowchart of a network connection method of another embodiment according to the present invention is illustrated.

901. A first UE in each group accesses a network initially.

When a first UE in each group accesses the network initially, the network allocates a group-based SRB and a group-based DRB thereto. The UEs accessing the network subsequently acquire the group-based SRB of the group, and may further acquire a group identity, such as a group-CRNTI, a group-ID in the group, a sequence number in the group and a sending cycle.

902. The network broadcasts the configuration information of group-based DRB of the group for the use of the MTC terminals in the group to send uplink data. Or, the network sends a group-based RB to the group users by multicast.

903-904. Through the group-based DRB or group-based RB, the terminals in the group connect with the network, and send uplink data.

After first accessing the network, a UE in the group, such as the MTC UE2 or MTC UE2, uses the sharing DRB in sequence in the group in manner of time-division. With regard to the specific contents, please refer to the description of manner A and B, which are not described repeatedly.

Based on above, if the establishment of a group-based SRB and a group-based DRB is completed when initial access is performed, after a UE accesses the network, the eNodeB directly notifies the UE of the group-based DRB configuration, and thus the establishment of a new end to end bearer from the core network to the access network is not needed.

In the subsequence process of data transmission, when configuring a DRB, the network configures the semi-persistent scheduling resources of SRS based on the data transmission cycle and size of transmitted data allocated to the UE. In another embodiment of the present invention, all MTC terminals in the group use a group C-RNTI to perform the SR request at a moment required by the eNodeB based on a certain grouping and discrete rule. If knowing the service type of MTC terminal, the eNodeB directly allocates resources needed by the service to the terminal, and at this time, the BSR request may be omitted. The eNodeB allocates the BSR resources to the MTC terminal, and then the MTC terminal sends a resource request by the BSR.

After knowing that the data of the MTC terminal is over, the eNodeB prepares for the transmission of next MTC terminal. The data of each terminal may be transmitted completely by one packet by optimization, thus avoiding the step of sequencing.

Figure 10:
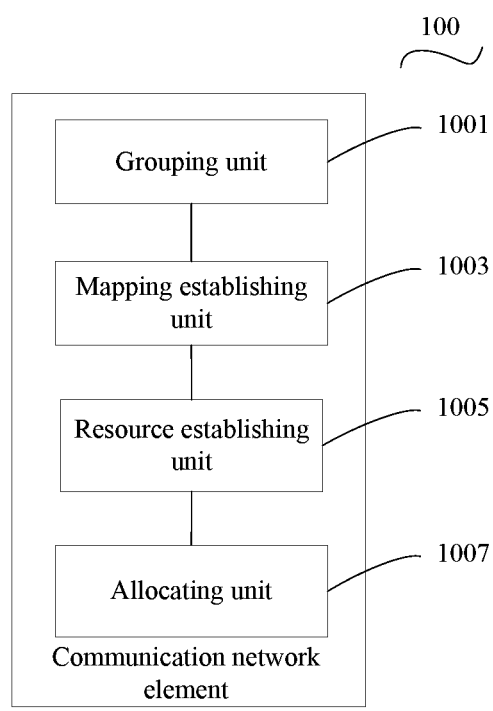
FIG. 10 is a schematic structure diagram of a communication network element 100 of another embodiment according to the present invention.

As shown in FIG. 10, a schematic structure diagram of a communication network element 100 of another embodiment according to the present invention is illustrated, wherein the communication network element 100 may be a device in the access network, or may be a device in the core network, or may also be a separately-set device. For example, the communication network may be a NodeB or an RNC of access network in the WCDMA network. For example, the communication network may be an eNodeB, MME or gateway in the LTE system. For example, the communication network element may be a BTS or a BSC in the GSM or CDMA system. The communication network element 100 may include a grouping unit 1001, a mapping establishing unit 1003, a resource establishing unit 1005 and an allocating unit 1007.

The grouping unit 1001 is used for grouping multiple terminals and allocating group identities; the mapping establishing unit 1003 is used for establishing mapping relationships between the group identities and terminal identities; the resource establishing unit 1005 is used for establishing a group-based signaling radio bearer and a group-based data radio bearer for each group; and the allocating unit 1007 is used for allocating, when a terminal in the group access the network, the terminal the group-based signaling radio bearer and the group-based data radio bearer corresponding to the group to which the terminal belongs according to the mapping relationship between a group identity and a terminal identity.

In another embodiment of the present invention, particularly, the grouping unit 1001 is used for allocating a same group identity to all terminals in an identical cell and establishing mapping relationships between the group identity and terminal identities, or for dividing all terminals in an identical cell into different groups according to a difference in service type, allocating different group identities to different groups and establishing mapping relationships between the group identities and terminal identities.

In another embodiment of the present invention, the grouping unit 1001 is further used for allocating sequence numbers to terminals in an identical group, and establishing mapping relationships between the sequence numbers and terminal identities, so that each terminal in an identical cell accesses the network in sequence in manner of time-division.

Figure 11:
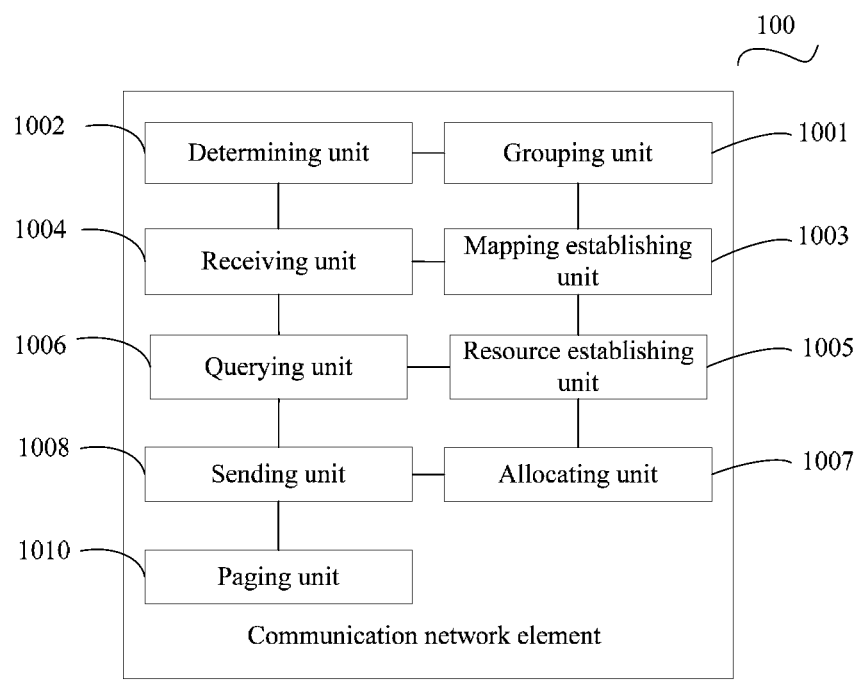
FIG. 11 is another schematic structure diagram of the communication network element 100 of another embodiment according to the present invention.

As shown in FIG. 11, another schematic structure diagram of the communication network element 100 of another embodiment according to the present invention is illustrated. The communication network element 100 further includes a determining unit 1002 for determining whether information of mapping relationship between group identity and terminal identity corresponding to the terminal identity is stored according to the terminal identity, before allocating the group identity. If the information of mapping relationship between group identity and terminal identity is not stored, the grouping unit 1001 is used for determining a group to which the terminal belongs and allocating a group identity to the a terminal and establishing a mapping relationship between the group identity and the terminal identity.

In another embodiment of the present invention, when the determining unit 1002 determines that the information of mapping relationship between group identity and terminal identity corresponding to the terminal identity is not stored according to the terminal identity and determines that there is no an allocable group identity, the grouping unit 1001 is used for increasing a group identity for the terminal and establishing a mapping relationship between the increased group identity and the terminal identity.

In another embodiment of the present invention, the communication network element 100 further includes a receiving unit 1004 and a querying unit 1005. The receiving unit 1004 is used for receiving a group identity sent by a terminal, and the querying unit 1005 is used for querying whether information of mapping relationship between group identity and terminal identity corresponding to the group identity is stored, and if the information of mapping relationship between group identity and terminal identity is not stored, the grouping unit 1001 is used for establishing a mapping relationship between the group identity and the terminal identity.

In another embodiment of the present invention, the communication network element 100 further includes a sending unit 1008 for sending the terminals a data reporting cycle (T) and a time period (i) for reporting data each time, or sending the terminals a data reporting cycle (T) and the maximum number (N) of users reporting in a reporting cycle, or sending the terminals the maximum number (N) of users reporting in a reporting cycle and a time period (i) for reporting data each time.

In another embodiment of the present invention, the sending unit 1008 is further used for sending the identity to the terminals by carrying the identity in a system message, Radio Resource Control Connection Setup (RRC CONNECTION SETUP) message, Physical Channel Reconfiguration (PHYSICAL CHANNEL RECONFIGURATION) message, Radio Bearer Reconfiguration message (RADIO BEARER RECONFIGURATION) or MAC head.

The group identity is a group Cell-Radio Network Temporary Identity (C-RNTI).

In another embodiment of the present invention, the communication network element 100 further includes a paging unit 1010 for sending a paging message to all terminals corresponding to the group identity, wherein the paging message includes access information of all members in the group and the access information includes the group-based signaling radio bearer and group-based data radio bearer of the members in the group.

The functions of the communication network 100 and units included in the communication network element 100 are just schematically described and summarized. With regard to the specific functions and operation process, please refer to the specific description of above method embodiments, which are not described repeatedly.

Figure 12:
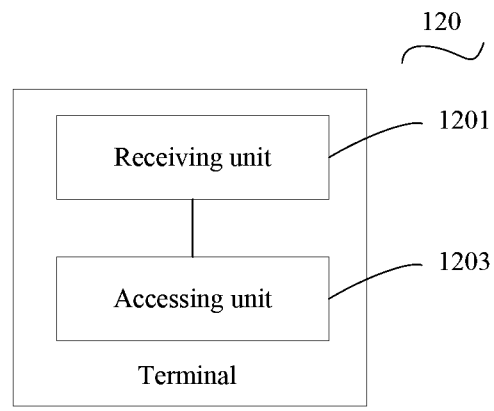
FIG. 12 is a schematic structure diagram of a terminal 120 of another embodiment according to the present invention.

As shown in FIG. 12, a schematic structure diagram of a terminal 120 of another embodiment of the present invention is illustrated. The terminal 120 includes a mobile terminal, fixed terminal or MTC terminal, etc. The MTC terminal means a terminal adopting M2M communication, which may be a terminal applied to various scenes, such as intelligent transport, telemedicine, monitor and control, smart grid, environmental detection, smart homes, etc.

The terminal 120 includes a receiving unit 1201 and an accessing unit 1203.

The receiving unit 1201 is used for receiving a group-based signaling radio bearer and a group-based data radio bearer corresponding to a group to which the terminal belongs and allocated to the terminal by the network according to a relationship between a group identity and a terminal identity. The accessing unit 1203 is used for initialing network access by using the group-based signaling radio bearer and the group-based data radio bearer.

The receiving unit 1201 is further used for receiving a data reporting cycle (T) and a time period (i) for reporting data each time sent by the network, or receiving a data reporting cycle (T) and the maximum number (N) of users reporting in a reporting cycle sent by the network, or receiving the maximum number (N) of users reporting in a sending cycle and a time period (i) for reporting data each time sent by the network.

In another embodiment of the present invention, the receiving unit 1201 is used for receiving a sequence number allocated by the network according to a mapping relationship between a group identity and a terminal identity to the terminal 120, and the accessing unit 1203 is used for initiating network access in sequence number in manner of time-division.

Figure 13:
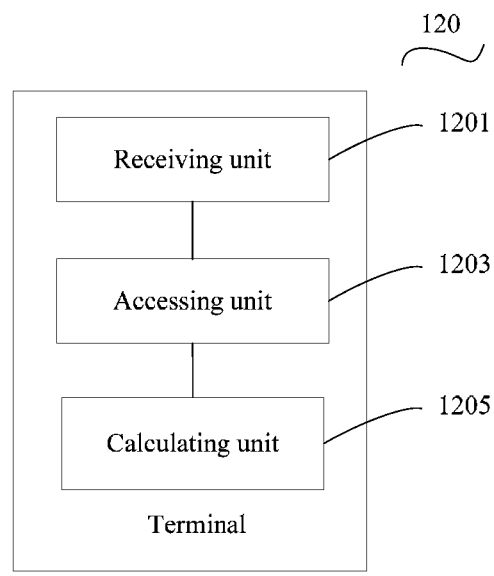
FIG. 13 is another schematic structure diagram of the terminal 120 of another embodiment according to the present invention.

In another embodiment of the present invention, as shown in FIG. 13, a schematic structure diagram of the terminal 120 of another embodiment according to the present invention is illustrated. The terminal 120 further includes a calculating unit 1205 for calculating access information for accessing the network according to a terminal identity and group parameters of the terminal before initiating network access, wherein the group parameters include: a data sending cycle (T); a time period (i) for reporting data each time and the maximum number (N) of users reporting in a reporting cycle.

For example, the calculating unit 1205 calculates the access information for accessing a network by the following formulas:

N=T/i, wherein N is the maximum number of users reporting in a reporting cycle;

P=k+UE ID mod N, wherein p is a serial number to which the terminal corresponds in a reporting cycle;

SFN=floor(i*p/10), wherein SFN is a system frame number of a moment at which the terminal accesses the network;

x=(i*p)mod 10, wherein x is a subframe number of a moment at which the terminal accesses the network;

i represents a period for reporting data each time, T represents a data sending cycle, floor represents rounding down, mod represents modulo and k is an integer which is larger than or equal to 0.

The functions of the terminal 120 and units included in the terminal 120 are just schematically described and summarized. With regard to the specific functions and operation process, please refer to the specific description of above method embodiments, which are not described repeatedly.

In another embodiment of the present invention, a communication system includes a communication network element 100 and a terminal 120. The communication network element 100 is used for grouping a plurality of terminals, allocating group identities, and establishing mapping relationships between the group identities and terminal identities, establishing a group-based signaling radio bearer and a group-based data radio bearer for each group, and allocating, when a terminal in each group access the network, the terminal the group-based signaling radio bearer and group-based data radio bearer corresponding to the group to which they belong according to the mapping relationships between the group identities and terminal identities, so that the terminal initiates network access by using the group-based signaling radio bearer and the group-based data radio bearer. The terminal 120 is used for receiving a group-based signaling radio bearer and group-based data radio bearer corresponding to a group to which the terminal belongs and allocated to the terminal by a network according to relationships between group identity and terminal identity, and initiating network access by using the group-based signaling radio bearer and the group-based data radio bearer.

Those skilled in the art may understand clearly that, for convenience and simplicity of description, corresponding processes of the aforementioned method embodiments may be referred to for specific operation processes of the above described systems, devices and units, which are not described repeatedly herein.

In the several embodiments provided by the present application, it should be understood that disclosed systems, devices and methods may be implemented by other manners. For example, device embodiments described above are just illustrative. For example, the division of units is just a division of logical functions, and there may be other division manners for practical implementations. For example, multiple units or components may be combined or integrated into another system, or some features may be neglected or may not be performed. At another point, the displayed or discussed mutual coupling or direct coupling or communication link may be indirect coupling or communication link through some interfaces, devices or units, which may be in an electrical form, a mechanical form or other form.

The units described as separated parts may be or may not be physically separated, and the parts displayed as units may be or may not be physical units, which may be located in one place or distributed to multiple network elements. Part or all units therein may be selected to implement the target of solutions provided in the present invention according to the actual demands.

In addition, in various embodiments of the present invention, various functional units may be integrated into one processing unit, or each unit may exist separately and physically, or two or more units may be integrated into one unit. The above integrated units may be implemented in the form of hardware or may be implemented in the form of software functional unit.

When the integrated unit is implemented in the form of a software functional unit and is sold or used as an independent product, the integrated unit may be stored in a computer readable storage medium. Based on this understanding, the technical solution or part that makes contributions to the prior art of the technical solution in the present invention may be essentially embodied in the form of a software product. The computer software product may be stored in a storage medium, and includes a number of instructions that enable a piece of computer equipment (may be a personal computer, a server, or a network equipment) to execute all or part of steps of the method described in various embodiments of the present invention. The preceding storage mediums includes various mediums that can store codes, such as, a U disk, a removable hard disk, a read-only memory (ROM), a random access memory (RAM), a magnetic disk, an optical disk, or the like.

The foregoing is only some specific embodiments of the invention without limited to the protection scope of the invention. It is easy for those skilled in the art to conceive changes or substitutions within the technical scope disclosed by the invention, which should fall in the protection scope of the invention. Therefore, the protection scope of the present invention should be defined by that of the claims.

What is claimed is:

1. A network connection method, comprising:
  grouping a plurality of terminals;
  allocating group identities;
  establishing mapping relationships between the group identities and terminal identities;

establishing a group-based signaling radio bearer and a group-based data radio bearer for each group; and allocating, when each terminal in the group accesses a network, the terminal, the group-based signaling radio bearer and the group-based data radio bearer corresponding to the group to which the terminal belongs, according to the mapping relationships between the group identities and the terminal identities, so that the terminal initiates network access by using the group-based signaling radio bearer and the group-based data radio bearer.

2. The method according to claim 1, wherein the grouping a plurality of the terminals, allocating the group identities and establishing the mapping relationship between the group identities and the terminal identities comprises one of the group consisting of:

allocating a same group identity to all terminals in an identical cell, and establishing mapping relationships between the group identity and terminal identities; and dividing the terminals in the identical cell into different groups according to a difference in a service type, allocating different group identities to the different groups, and establishing the mapping relationships between the group identities and the terminal identities.

3. The method according to claim 1, further comprising:

determining, before allocating a group identity, whether information of mapping relationship between a group identity and a terminal identity corresponding to the terminal identity is stored, according to a terminal identity;

determining the group to which the terminal belongs, if the information of the mapping relationship between the group identity and the terminal identity is not stored, and allocating the group identity to the terminal and establishing a mapping relationship between the group identity and the terminal identity; and using the group identity directly in a subsequent process, if the information of mapping relationship between the group identity and the terminal identity is stored.

4. The method according to claim 3, further comprising:

increasing a group identity for the terminal and establishing a mapping relationship between the increased group identity and the terminal identity, if it is determined, according to the terminal identity, that the information of mapping relationship between the group identity and the terminal identity corresponding to the terminal identity is not stored and it is determined that there is no allocable group identity.

5. The method according to claim 1, further comprising:

receiving a group identity sent by the terminal;

querying whether information of mapping relationship between a group identity and a terminal identity corresponding to the group identity is stored;

establishing a mapping relationship between the group identity and the terminal identity, if the information of mapping relationship between the group identity and the terminal identity is not stored; and using the group identity directly in a subsequent process, if the information of mapping relationship between the group identity and the terminal identity is stored.

6. The method according to claim 1, further comprising:

allocating sequence numbers to terminals in an identical group, and establishing a mapping relationship between a sequence number and a terminal identity, so that each terminal in the identical group accesses the network in sequence in manner of time-division.

7. The method according to claim 1, further comprising:

sending a group identity to the terminal by carrying the group identity in one message of the group consisting of: a system message, Radio Resource Control (RRC) Connection Setup message, Physical Channel Reconfiguration message, Radio Bearer Reconfiguration message and a Media Access Control (MAC) head.

8. The method according to claim 1, further comprising one of the group consisting of:

sending the terminal a data reporting cycle (T) and a time period (i) for reporting data each time;

sending the terminal the data reporting cycle (T) and a maximum number (N) of users reporting in a reporting cycle; and sending the terminal the maximum number (N) of users reporting in the reporting cycle and the time period (i) for reporting the data each time.

9. The method according to claim 1, further comprising:

sending a paging message to all terminals corresponding to a group identity, wherein the paging message comprises access information of all members in the group and the access information comprises the group-based signaling radio bearer and the group-based data radio bearer of the members in the group.

10. The method according to claim 1, wherein one of the group identities is a group Cell Radio Network Temporary Identity (C-RNTI).

11. A network connection method, comprising:

receiving, by a terminal, a group-based signaling radio bearer and a group-based data radio bearer corresponding to a group to which the terminal belongs, wherein the group-based signaling radio bearer and the group-based data radio bearer are allocated to the terminal by a network according to a mapping relationship between a group identity and a terminal identity; and initiating, by the terminal, a network access by using the group-based signaling radio bearer and the group-based data radio bearer.

12. The method according to claim 11, further comprising one of the group consisting of:

wherein all terminals in an identical cell correspond to a same group identity; and wherein terminals in an identical cell are divided into different groups according to a difference in a service type.

13. The method according to claim 11, further comprising:

receiving, by terminals in an identical group, sequence numbers allocated by the network, wherein each terminal in the identical group accesses the network in a sequence number in manner of time-division.

14. The method according to claim 11, further comprising one of the group consisting of:

receiving, by the terminal, a data reporting cycle (T) and a time period (i) for reporting data each time sent by the network;

receiving, by the terminal, the data reporting cycle (T) and a maximum number (N) of users reporting in a reporting cycle sent by the network; and receiving, by the terminal, the maximum number (N) of users reporting in a reporting cycle and the time period (i) for reporting the data each time sent by the network.

15. The method according to claim 11, further comprising:

calculating, by the terminal, access information for accessing the network according to the terminal identity and group parameters of the terminal before initiating the network access, wherein the grouping parameters comprises: a data sending cycle (T), a time period (i) for reporting data each time and a maximum number (N) of users reporting in a reporting cycle.

16. The method according to claim 15, wherein the calculating access information for accessing the network is performed according to the following formulas:

N=T/i, wherein N is the maximum number of users reporting in the reporting cycle;

p=k+UE ID mod N, wherein p is a corresponding serial number of the terminal in the reporting cycle;

SFN=floor (i*p/10), wherein SFN is a System frame Number of a moment at which the terminal accesses the network;

x=(i*p) mod 10, wherein x is a subframe number of a moment at which the terminal accesses the network; and i represents a time period for reporting data each time, T represents a data sending cycle, UE ID is a terminal identity, floor represents rounding down, mod represents modulo and k is an integer which is larger than or equal to 0.

17. A communication network element, comprising:
a first processor, configured to group multiple terminals and allocate group identities;
a second processor, configured to establish mapping relationships between the group identities and terminal identities;
a third processor, configured to establish a group-based signaling radio bearer and a group-based data radio bearer for each group;
a forth processor, configured to allocate each terminal in the group, the group-based signaling radio bearer and the group-based data radio bearer corresponding to the group to which the terminal belongs, according to the mapping relationship between the group identities and the terminal identities, when the terminal in the group access a network.

18. The communication network element according to claim 17, wherein the first processor is configured to implement one of the group consisting of:
allocating a same group identity to all terminals in an identical cell and establish the mapping relationships between the group identity and the terminal identities; and
dividing all the terminals in the identical cell into different groups according to a difference in service type, and allocate different group identities to the different groups and establish the mapping relationships between the group identities and the terminal identities.

19. The communication network element according to claim 17, further comprising:
a fifth processor, configured to determine whether information of mapping relationship between a group identity and a terminal identity corresponding to the terminal identity is stored, according to the terminal identity, before allocating the group identity;
wherein the first processor is configured to determine the group to which the terminal belongs, and allocate the group identity to the terminal and establish a mapping relationship between the group identity and the terminal identifier, if the information of mapping relationship between the group identifier and the terminal identity is not stored.

20. The communication network element according to claim 17, further comprising:
a receiver, configured to receive the group identity sent by the terminal;

a sixth processor, configured to query whether information of mapping relationship between group identity and terminal identity corresponding to the group identity is stored;
wherein the first processor is configured to establish the mapping relationship between the group identity and the terminal identity, if the information of mapping relationship between the group identity and the terminal identity is not stored.

21. The communication network element, further comprising:
a transmitter, configured to implement one of the group consisting of:
sending the terminal a data reporting cycle (T) and a time period (i) for reporting data each time;
sending the terminal the data reporting cycle (T) and a maximum number (N) of users reporting in a reporting cycle; and
sending the terminal the maximum number (N) of users reporting in a reporting cycle and the time period (i) for reporting the data each time.

22. The communication network element according to claim 17, further comprising:
a seventh processor, configured to send a paging message to all terminals corresponding to the group identity, wherein the paging message comprises access information of all members in the group and the access information comprises the group-based signaling radio bearer and group-based data radio bearer of the members in the group.

23. A terminal, comprising:
a receiver, configured to receive a group-based signaling radio bearer and a group-based data radio bearer corresponding to a group to which the terminal belongs, wherein the group-based signaling radio bearer and the group-based data radio bearer are allocated to the terminal by a network according to a mapping relationship between a group identity and a terminal identity;
a processor, configured to initiate a network access by using the group-based signaling radio bearer and the group-based data radio bearer.

24. The terminal according to claim 23, wherein the receiver is configured to implement one of the group consisting of:
receiving a data reporting cycle (T) and a time period (i) for reporting data each time sent by the network;
receiving the data reporting cycle (T) and a maximum number (N) of users reporting in a reporting cycle sent by the network; and
receiving the maximum number (N) of users reporting in the reporting cycle and the time period (i) for reporting the data each time sent by the network.

25. The terminal according to claim 23, wherein the processor is further configured to calculate access information for accessing the network, according to a terminal identity and group parameters of the terminal before initiating the network access, wherein the group parameters comprises: a data sending cycle (T); a time period (i) for reporting data each time and the maximum number (N) of users reporting in a reporting cycle.

26. The terminal according to claim 25, wherein the processor is specially configured to calculate the access information for accessing the network through the following formulas:
N=T/i, wherein N is the maximum number of users reporting in the reporting cycle;

P=k+UE ID mod N, wherein p is a corresponding serial number of the terminal in the reporting cycle;

SFN=floor(i*p/10), wherein SFN is a System Frame Number of a moment at which the terminal accesses the network;

x=(i*p)mod 10, wherein x is a subframe number of a moment at which the terminal accesses the network; and i represents a period for reporting data each time, T represents a data sending cycle, UE ID is a terminal identity, floor represents rounding down, mod represents modulo and k is an integer which is larger than or equal to 0.

* * * * *